UNITED STATES PATENT OFFICE.

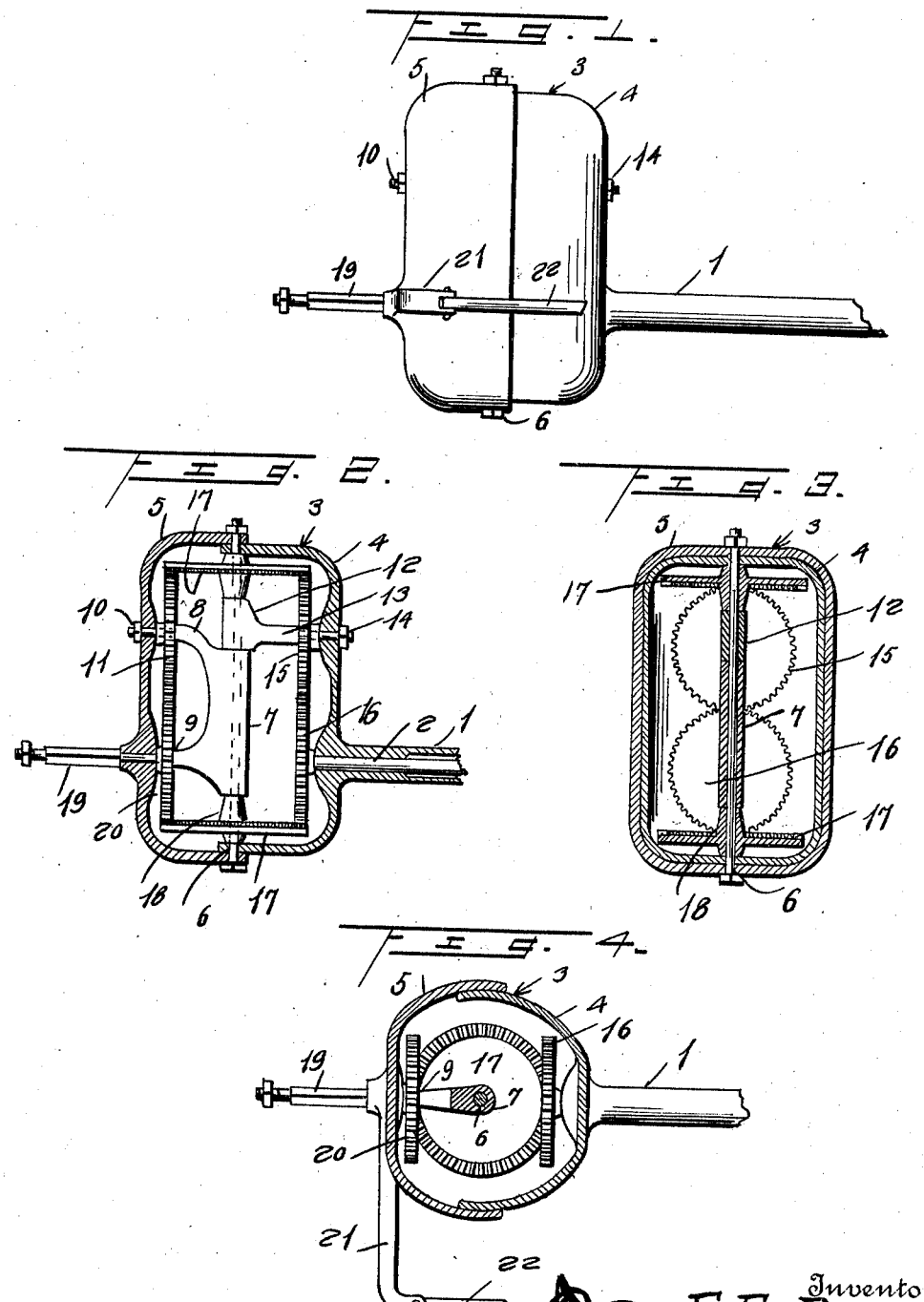

FRANCIS E. RUNNALLS, OF MAYNOOTH, ONTARIO, CANADA.

COMBINATION DRIVE AND STEERING GEAR.

1,315,040.   Specification of Letters Patent.   Patented Sept. 2, 1919.

Application filed October 30, 1918. Serial No. 260,383.

*To all whom it may concern:*

Be it known that I, FRANCIS E. RUNNALLS, a subject of the King of Great Britain, residing at Maynooth, in the Province of Ontario and Dominion of Canada, have invented certain new and useful Improvements in Combination Drive and Steering Gears; and I do hereby declare the following to be a full, clear, and exact description of the invention, such as will enable others skilled in the art to which it appertains to make and use the same.

This invention relates to improvements in combination drive and steering gears, and has for one of its objects the provision of means whereby the front wheels of a motor vehicle can be driven like the rear wheels and which means will permit the wheels to move or turn about a vertical axis so as to steer the vehicle.

Another object of this invention is the provision of a combination drive and steering gear of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a rear elevation of a combination drive and steering gear constructed in accordance with my invention, Fig. 2 is a vertical sectional view of the same, Fig. 3 is a transverse sectional view illustrating means of permitting the front wheels to turn about a vertical axis, and Fig. 4 is a transverse sectional view illustrating the steering arm.

Referring in detail to the drawings, the numeral 1 indicates a housing in which is journaled a front axle 2. The front axle 2 is adapted to be driven by the power plant of the vehicle in any well known manner, and as each of the knuckles to the front axle are identical in construction, reference to one is thought sufficient for both.

A sectional casing 3 consisting of inner and outer sections 4 and 5 are pivotally connected at their adjoining ends by a vertically disposed pivot bolt 6, on which is mounted a bearing 7 provided with relatively spaced arms 8 and 9. The arm 8 extends through the section 5 of the casing 3 and receives a nut 10 for aiding in holding the casing in assembled position, and said arm has journaled thereon a gear 11. A bearing 12 is journaled upon the pivot bolt 6 above the bearing 7 and has formed thereon an arm 13 extending through the section 4 of the casing 3 and receives a nut 14 for aiding in retaining the sections of the casing together. A gear 15 is journaled upon the arm 13 and meshes with a gear 16 secured to the end of the axle 2. Upper and lower gears 17 are journaled upon the pivot bolt 6 and mesh with the gears 15 and 16. The gears 17 are provided with bearing portions 18 adapted to engage the bearings 12 and 7 for spacing said gears away from the bearings. The upper gear 17 is also in mesh with the gear 11. The arm 9 extends through the section 5 adjacent its lower end and has mounted thereon an axle spindle 19 provided with squared portions to receive the squared bore of an axle hub, and has its inner end secured to a gear 20 journaled upon the arm 9 and in mesh with the gear 11 and the lower gear 17. It will therefore be seen that upon rotation of the shaft of the axle 2, the spindle 19 will be rotated by the various gears heretofore mentioned. A steering arm 21 is formed upon the section 5 and extends rearwardly and has pivoted thereto the usual steering mechanism 22, whereby the section 5 may be moved about a vertical axis upon the pivot bolt 6 to steer the vehicle. It will be noted that upon the casing 5 swinging upon a vertical axis, the gears 11 and 20 rotate about the upper and lower gears 17, thus permitting the turning movement of the front wheels.

While I have shown and described the preferred embodiment of my invention, it will be understood that minor changes in construction, combination, and arrangement of parts may be made without departing from the spirit and scope of the invention as claimed.

Having thus described my invention, what I claim is:—

A combination drive and steering gear comprising a sectional casing, a pivot bolt pivotally connecting said sectional casing together, an axle extending in said casing, a bearing journaled upon said pivot bolt having relatively spaced arms extending through one section of the casing, gears journaled upon said arms and in mesh with each other, a second bearing journaled upon the pivot bolt and extending to the other section of the casing, a gear journaled upon said last named bearing, a gear secured to the axle and in mesh with the second named gear, upper and lower gears journaled upon the pivot bolt and in mesh with the first named pairs of gears and the last named gears, an axle spindle journaled upon one of the arms of the first named bearing and formed upon one of the first named gears, and a steering arm formed upon one of the sections.

In testimony whereof I affix my signature in presence of two witnesses.

FRANCIS E. RUNNALLS.

Witnesses:
J. D. Payne,
S. J. Henderson.

Copies of this patent may be obtained for five cents each, by addressing the "Commissioner of Patents, Washington, D. C."